US005538370A

United States Patent [19]
Glenn

[11] Patent Number: 5,538,370
[45] Date of Patent: Jul. 23, 1996

[54] DEVICE FOR DRILLING A SQUARE HOLE

[76] Inventor: David R. Glenn, 5527 Elmbank Rd., Rancho Palos Verdes, Calif. 90274

[21] Appl. No.: 221,785

[22] Filed: Apr. 1, 1994

[51] Int. Cl.$^6$ .................................................... B23B 51/08
[52] U.S. Cl. .............................................. 408/30; 144/78
[58] Field of Search ................................ 408/22, 24, 30, 408/67, 117, 118; 144/74, 78, 79

[56] References Cited

U.S. PATENT DOCUMENTS

| | | | |
|---|---|---|---|
| 159,456 | 2/1875 | Rydbeck | 144/79 |
| 2,439,558 | 4/1948 | Brown | 144/78 |
| 2,996,090 | 8/1961 | Smith | 144/79 |
| 5,297,903 | 3/1994 | Hilton | 144/78 |

*Primary Examiner*—Daniel W. Howell
*Attorney, Agent, or Firm*—Roger A. Marrs

[57] ABSTRACT

A tool is disclosed herein for drilling a square hole in a workpiece adapted to be mounted in the chuck jaws of a drill press. The tool includes a drive shaft having an enlarged spindle provided midway between its opposite ends. One shaft end releasably engages with the chuck jaws while the opposite end includes a threaded bore. A stationary body rotatably receives the shaft and spindle via a pair of spaced roller thrust bearings and a sleeve bushing. A flat drill downwardly depends from the drive shaft threaded bore and terminates in a spade cutting edge. A hollow square chisel is secured to the body and encloses the flat drill. The flat drill bores a circular or round hole in the workpiece while the square chisel forms the corners of a square hole.

5 Claims, 1 Drawing Sheet

DEVICE FOR DRILLING A SQUARE HOLE

BACKGROUND OF THE INVENTION

1. Field of the Invention

The present invention relates to the field of drilling apparatus, and more particularly to a novel device for drilling a square hole which employs a twist drill and a chisel simultaneously to form the square hole.

2. Brief Description of the Prior Art

In the past, it has been difficult to drill or form a square hole due to the fact that the use of a twist drill readily removes bulk material from the work piece but results in a round hole. However, when a chisel having square ends is employed, a square hole can be made but the removal of bulk material requires time and is relatively inefficient. Some attempts have been made to overcome these problems by employing a square chisel with a twist drill in the center so that bulk material is removed by the twist drill and the square corners of the hole are made by the square chisel. Although this procedure and apparatus does work for its intended purpose, difficulties have been encountered when mounting and holding such a drill and chisel combination so that the drilling procedure is efficient and can be performed at a rapid pace.

Therefore, a long-standing need has existed to provide a device or apparatus which will readily adapt a combined chisel and twist drill into a single unitary construction for mounting on the rotating shaft of a conventional drill press. Such a device is preferred to permit rotation of the twist drill and stationary mounting of the square chisel whereby both elements operate in unison to remove work piece material and shape the hole simultaneously.

SUMMARY OF THE INVENTION

Accordingly, the above problems and difficulties are avoided by the present invention which provides a device for drilling square holes in a work piece which is adapted to be mounted in the rotating chuck jaws of a conventional drill press. The tool or device includes a drive shaft rotating in response to rotation of the chuck jaws which includes an enlarged spindle midway between its opposite ends, a selected end of the shaft releasably engaging with the chuck jaws while the opposite end includes an internal threaded bore. A stationary body rotatably mounts the shaft and spindle via a pair of spaced-apart roller thrust bearings and further includes a sleeve bushing extending a substantial length of the shaft. Preferably, a flat spade drill downwardly depends from the drive shaft threaded bore and terminates in a spade-cutting edge which is effective to cut and remove bulk material from the work piece. A hollow square chisel secured to the stationary body encloses the flat drill and the square chisel provides a slot for permitting chips, debris and bulk material to escape exteriorly of the device through the side opening or slot. Consequently, the flat drill bores a circular or round hole in the work piece so as to remove bulk material while the square chisel forms the corners of a square hole.

Therefore, it is among the primary objects of the present invention to provide a novel combined drilling apparatus which includes a rotating center drill and a square chisel surrounding the drill so that a square hole can be formed in a single drilling and chiseling combined operation.

Another object of the present invention is to provide a novel adaptor for mounting a square chisel and a flat drill so that depression into a work piece such as wood or the like forms a square hole.

Another object of the present invention is to provide an adaptor for a combination drill and chisel apparatus for forming a square hole which not only removes bulk material from the work piece but shapes the resultant hole in the form of a square.

Still a further object of the present invention is to provide a novel adaptor device for mounting a square chisel and a rotating flat drill in order to form a square hole in a work piece composed of soft material.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
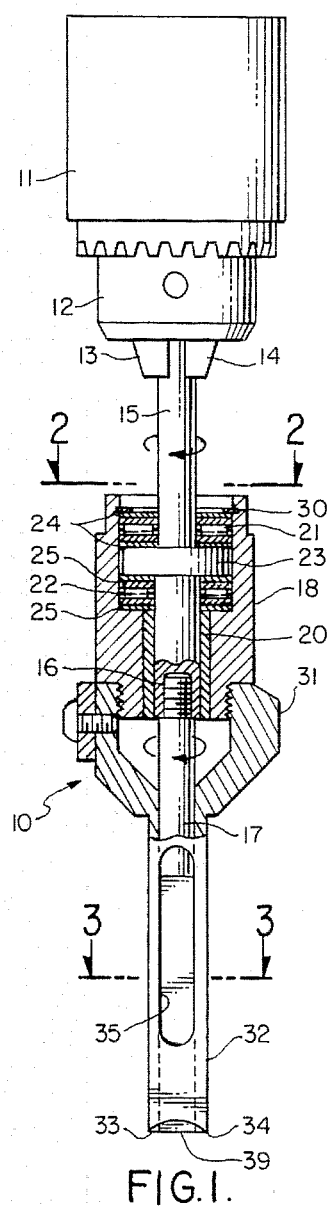
FIG. 1 is a longitudinal cross-sectional view of the novel tool or device for drilling square holes incorporating the present invention.

Referring to FIG. 1, the novel drill for forming square holes is indicated in the general direction of arrow 10 wherein numeral 11 represents a portion of a conventional drill press into which the device 10 is rotatably carried. The drill press 11 includes a chuck 12 having converging jaw members 13 and 14 which releasably hold a shaft 15. Therefore, the shaft 15 is rotatably turned by the chuck and power of the drill press 11. It is noted that the shaft 15 further includes a threaded bore 16 which threadably receives the end of a flat drill 17.

A stationary body 18 rotatably accepts the shaft 15 by means of a sleeve bushing 20 and by incorporating a pair of thrust roller bearings 21 and 22 carried in a receptacle formed in the body 18. The shaft 15 includes an integral spindle 23 which is disposed between the roller thrust bearings 21 and 22 so that load factors encountered are distributed throughout the body during the drilling and cutting procedure. Each of the respective roller thrust bearings are located between a pair of washers. One pair of washers associated with bearing 21 is identified by the numeral 24 while a lower thrust bearing 22 is disposed between the washer set identified by numeral 25. A snap ring 30 is engaged with the uppermost washer of the set 24 to hold the bearing assembly within the receptacle of the member 18.

Figure 3:
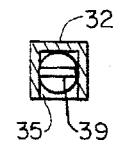
FIG. 3 is a transverse cross-sectional view as taken in the direction of arrows 3—3 of FIG. 1 illustrating the square chisel and the flat drill combination.

Fixedly secured to the lower end of member 18 is a taper section 31 which rotatably mounts the flat drill 17 therethrough and further provides for a box chisel 32 which surrounds the flat drill 17. The box chisel is of a square geometry or configuration in cross-section and includes a chisel tip with cutting edges identified by numerals 33 and 34 respectively. The box chisel includes an open slot 35, as shown in FIGS. 1 and 3 in order to provide a passageway for ejection of cuttings or chips during a drilling procedure. The cutting edge of the flat drill is identified by numeral 39 and it is to be understood that the combination of the box chisel and the flat drill provide a combination which permits drilling and reaming or chiseling of the work piece in one operation.

Figure 2:
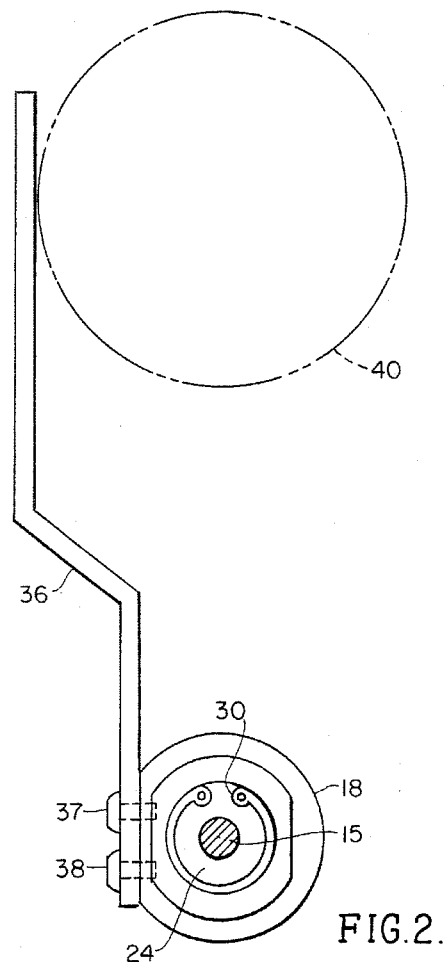
FIG. 2 is a transverse cross-sectional view of the device shown in FIG. 1 as taken in the direction of arrows 2—2 thereof.

Referring now in detail to FIG. 2, it can be seen that the snap-ring 30 is fitted into a mating groove in the body 18 in order to hold the thrust bearing assembly and washer sets in position with respect to the rotating spindle 23 and shaft 15. In order to keep the body or housing 18 from rotating, a stabilizing arm 36 is attachably carried at one end to the housing by fasteners 37 and 38 while the opposite end bears against the side of the drill press broadly indicated by numeral 40. The arm bears against the drill press as a stop in order to keep the square chisel from turning. It is maintained in contact by the centrifugal force developed during the drilling procedure.

Figure 4:
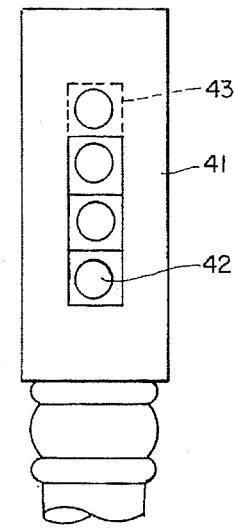
FIG. 4 is a top plan view of a work piece in which square holes are formed by the use of the novel inventive device for drilling square holes.

Referring now in detail to FIG. 4, a work piece 41 is illustrated which is composed of a soft material such as wood or the like and it can be seen that a hole such as hole 42 has been drilled by the twisting movement of the cutting edge 39 associated with the flat drill 17 while the square sides and corners of the hole have been made by the chisel edges 33 and 34 carried on the end of the chisel 32. It is also understood that a single square hole may be created through the use of the present invention or a plurality of such holes may be placed in alignment, as illustrated in FIG. 4, in order to form a slot such as is conventionally used in mortis construction for the making of furniture or cabinetry. In broken lines, a hole intended to be made is illustrated by numeral 43 while the holes shown in solid lines are previously drilled holes forming an elongated slot.

In view of the foregoing, it can be seen that the device for drilling square holes of the present invention provides a novel means for attaching a combination chisel/drill to the revolving chuck of a drill press which permits drilling and reaming or chiseling procedures to be performed on a work piece in one operation. A flat drill 17 or other twist drill may be employed with one or more cutting edges and with grooves or passageways for ejecting of cuttings or chips through the slot 35 in the square chisel 32.

As the shaft 15 rotates, the body or housing 18 is maintained stationary with respect to the shaft via the stabilizing arm 36. As downward pressure is applied through the shaft 15 as it is rotating, the cutting action of the twist or flat drill 17 provides a conveyor to remove chips from cuttings developed in the work piece as the chips are formed and ejected through the slot 35. The chisel edge of the square chisel cuts the material, such as wood, of the work piece and pushes aside the chips until they escape through the side opening or slot 35.

The body or housing 18, in combination with the body section 31, provides an adaptor for rotatably holding the rotating drill 17 and for holding the stationary chisel in position where it surrounds the internally rotating drill 17. By employing the shaft 15 with a threaded bore, any one of a number of drill shanks which are threaded may be selectively engaged with the threaded bore by inserting the drill through the open end of the square chisel 32 and into threadable engagement with the threaded bore. The thrust bearings 21 and 22 carry any applied loads into the housing or body and through the stabilizing arm 36 to the press 40. The thrust bearings as well as the sleeve bushing 20 readily permit rotation of the shaft 15 within the housing or body 18 and the enlarged diameter spindle 23 is maintained within the recess of the body or housing 18 between the thrust bearings. The bore at the end of the body section 31 rotatably carries or stabilizes the shank of the drill 17 and maintains the drill in proper alignment with the surrounding stationary chisel 32.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit of this invention.

What is claimed is:

1. A device for producing a square hole in a workpiece comprising:

a housing having an open central bore;

a hollow box chisel of square cross-section downwardly depending from said housing and having an open-ended bore coextensive with said housing open-ended bore;

a turning drill rotatably carried in said housing bore and said chisel bore;

said turning drill and said chisel having cutting tips immediately adjacent to each other;

means detachably connected with said turning drill for rotating said turning drill;

means attached to said box chisel for maintaining said box chisel stationary with respect to said turning drill;

said housing includes an internal cavity coaxial with said housing central bore;

a pair of roller thrust bearings disposed in said housing cavity; and said turning shaft having a spindle extending into said cavity between said pair of roller thrust bearings and acting in cooperation therewith to transfer applied loads from said shaft to said housing via said roller thrust bearings.

2. The invention as defined in claim 1 including:

a pair of washers disposed on opposite sides of each said roller thrust bearings respectively between said shaft spindle and said housing.

3. The invention as defined in claim 2 including a shoulder on said housing joining with said box chisel constituting a limit stop when engaged with the workpiece to determine maximum hole depth.

4. The invention as defined in claim 1 including:

an elongated extension arm having opposite ends;

one end of said arm ends detachably connected to said housing; and the other end of said arm disposed in engagement with said means for rotating said turning drill.

5. The invention as defined in claim 3 including:

a snap lock ring releasably engagable with said housing within said cavity maintaining said washers and said roller thrust bearings in position within said cavity.

* * * * *